United States Patent
Sato et al.

(10) Patent No.: US 12,229,643 B2
(45) Date of Patent: Feb. 18, 2025

(54) TEACHING DATA EXTENDING DEVICE, TEACHING DATA EXTENDING METHOD, AND PROGRAM

(71) Applicant: NEC Corporation, Tokyo (JP)

(72) Inventors: Hideaki Sato, Tokyo (JP); Kyota Higa, Tokyo (JP); Kota Iwamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1000 days.

(21) Appl. No.: 17/280,252

(22) PCT Filed: Oct. 5, 2018

(86) PCT No.: PCT/JP2018/037377
§ 371 (c)(1),
(2) Date: Mar. 26, 2021

(87) PCT Pub. No.: WO2020/070876
PCT Pub. Date: Apr. 9, 2020

(65) Prior Publication Data
US 2022/0044147 A1 Feb. 10, 2022

(51) Int. Cl.
*G06F 16/583* (2019.01)
*G06F 16/28* (2019.01)
*G06N 20/00* (2019.01)

(52) U.S. Cl.
CPC ............ *G06N 20/00* (2019.01); *G06F 16/285* (2019.01)

(58) Field of Classification Search
CPC ........ G06N 20/00; G06N 3/044; G06N 3/045; G06N 20/01; G06F 16/285
See application file for complete search history.

(56) References Cited

U.S. PATENT DOCUMENTS

| | | | |
|---|---|---|---|
| 2007/0011127 A1 | 1/2007 | Yamashita et al. | |
| 2009/0074288 A1* | 3/2009 | Nishida | G06V 30/413 382/190 |
| 2012/0246099 A1* | 9/2012 | Kawahara | G06F 18/2411 706/12 |
| 2018/0276471 A1* | 9/2018 | Shibata | G06Q 10/06393 |
| 2018/0336435 A1* | 11/2018 | Takeuchi | G06F 15/76 |
| 2019/0050684 A1* | 2/2019 | Kondo | G06F 18/217 |

(Continued)

FOREIGN PATENT DOCUMENTS

| | | | | |
|---|---|---|---|---|
| CN | 111108368 A | * | 5/2020 | ......... G01N 21/8851 |
| CN | 108573289 B | * | 8/2022 | ........... G06F 16/353 |

(Continued)

OTHER PUBLICATIONS

International Search Report for PCT Application No. PCT/JP2018/037377, mailed on Jan. 8, 2018.

(Continued)

*Primary Examiner* — Hassan Mrabi

(57) ABSTRACT

A teaching data extending device includes: a relationship acquiring unit that obtains a relationship between a plurality of features included in each of a plurality of teaching data; a feature selecting unit that selects any one or more of the plurality of features based on the relationship; and a teaching data extending unit that generates, for one or more teaching data, new teaching data in which a value of the feature selected by the feature selecting unit is replaced with a value of the feature in another teaching data classified in a same class.

10 Claims, 9 Drawing Sheets

(56) References Cited

U.S. PATENT DOCUMENTS

| | | | | |
|---|---|---|---|---|
| 2019/0139213 A1* | 5/2019 | Kurita | ................... | G06F 18/214 |
| 2019/0251471 A1* | 8/2019 | Morita | ................... | G06F 16/583 |
| 2020/0193285 A1* | 6/2020 | Ishii | ....................... | G06N 3/084 |
| 2020/0257925 A1* | 8/2020 | Kuwajima | ........... | G06F 18/2113 |
| 2021/0049398 A1* | 2/2021 | Kurita | ................... | G06V 10/806 |
| 2021/0373542 A1* | 12/2021 | Natsumeda | ........ | G05B 23/0221 |

FOREIGN PATENT DOCUMENTS

| | | | | |
|---|---|---|---|---|
| JP | 2000057349 A | * | 2/2000 | |
| JP | 2001256480 A | * | 9/2001 | |
| JP | 2006-127446 A | | 5/2006 | |
| JP | 2006-309485 A | | 11/2006 | |
| JP | 2018-072029 A | | 5/2018 | |
| KR | 20180079391 A | * | 7/2018 | ............. G06N 3/084 |
| WO | WO-2014207991 A1 | * | 12/2014 | ......... G06K 9/00778 |
| WO | WO-2016203956 A1 | * | 12/2016 | ............ C12M 41/36 |
| WO | WO-2019026104 A1 | * | 2/2019 | ........... G06K 9/4609 |
| WO | WO-2019172451 A1 | * | 9/2019 | ......... G06F 18/2155 |

OTHER PUBLICATIONS

N. V. Chawla et al., SMOTE: Synthetic Minority Over-sampling Technique, 2002, pp. 321-357. [retrieved on Dec. 18, 2018], Retrieved from the Internet: <URL: https://arxiv.org/pdf/1106.1813.pdf>.

Satoko Shinjo et al., Automatic Synthesis of Training Data for Sign Language Recognition using HMM, Proceedings of the Human Interface Symposium, 2007, pp. 475-480, Japan.

International Search Report for PCT Application No. PCT/JP2018/037377, mailed on Jan. 8, 2019.

* cited by examiner

TEACHING DATA EXTENDING DEVICE, TEACHING DATA EXTENDING METHOD, AND PROGRAM

This application is a National Stage Entry of PCT/JP2018/037377 filed on Oct. 5, 2018, the contents of all of which are incorporated herein by reference, in their entirety.

TECHNICAL FIELD

The present invention relates to a teaching data extending device, a teaching data extending method, and a program.

BACKGROUND ART

In supervised machine learning, machine learning is performed using a teaching data, which is a combination of data that represents features of a learning target, such as images acquired by capturing the learning target or sensor data relating to the learning target, and labels that indicate the correct answer (correct learning result).

For example, in Patent Document 1, it is described that in order to predict the length of time from the start of use of a component until failure, machine learning is performed using as a teaching data, a combination of a feature that represents a feature of the vibrations applied to the component, and a label that indicates the length of time from the start of use of the component until failure.

Furthermore, in addition to using image data or sensor data relating to the learning target as they are, processed data is sometimes used in machine learning.

For example, in Patent Document 2, it is described that in order to divide images into classes, machine learning is performed by extracting features from image information, and then calculating a feature from a combination (for example, a weighted total) of the extracted features.

PRIOR ART DOCUMENTS

Patent Documents

[Patent Document 1] Japanese Unexamined Patent Application, First Publication No. 2018-72029
[Patent Document 1] Japanese Unexamined Patent Application, First Publication No. 2006-127446

SUMMARY OF THE INVENTION

Problem to be Solved by the Invention

A large amount of data is required to learn a model (such as a classifier) having good analysis accuracy using a machine learning method such as deep learning. However, it generally requires time to collect a large amount of data in a real environment, and the management of equipment while continuously collecting data over a long period of time becomes a burden on the person in charge of managing the data collection and the data processing.

If the amount of data that needs to be collected in a real environment for machine learning can be reduced, the time required for data collection can be reduced. In this respect, the burden on the person in charge of managing the data collection and the data processing can be reduced.

An example object of the present invention is to provide a teaching data extending device, a teaching data extending method, and a program which are capable of solving the above problems.

Means for Solving the Problem

According to a first example aspect of the present invention, a teaching data extending device includes: a relationship acquiring unit that obtains a relationship between a plurality of features included in each of a plurality of teaching data; a feature selecting unit that selects any one or more of the plurality of features based on the relationship; and a teaching data extending unit that generates, for one or more teaching data, new teaching data in which a value of the feature selected by the feature selecting unit is replaced with a value of the feature in another teaching data classified in a same class.

According to a second example aspect of the present invention, a teaching data extending method includes the steps of: obtaining a relationship between a plurality of features included in each of a plurality of teaching data; selecting any one or more of the plurality of features based on the relationship; and generating, for one or more teaching data, new teaching data in which a value of the selected feature is replaced with a value of the feature in another teaching data classified in a same class.

According to a third example aspect of the present invention, a program is a program for causing a computer to execute the steps of: obtaining a relationship between a plurality of features included in each of a plurality of teaching data; selecting any one or more of the plurality of features based on the relationship; and generating, for one or more teaching data, new teaching data in which a value of the selected feature is replaced with a value of the feature in another teaching data classified in a same class.

Effect of the Invention

According to the teaching data extending device, the teaching data extending method, and the program described above, it is possible to reduce the amount of data which needs to be collected in a real environment for machine learning.

EXAMPLE EMBODIMENT

Hereunder, example embodiments of the present embodiment will be described. However, the following example embodiments do not limit the invention set forth in the scope of the claims. Furthermore, all combinations of features described in the example embodiments may not be essential to the solution means of the invention.

First Example Embodiment

Figure 1:
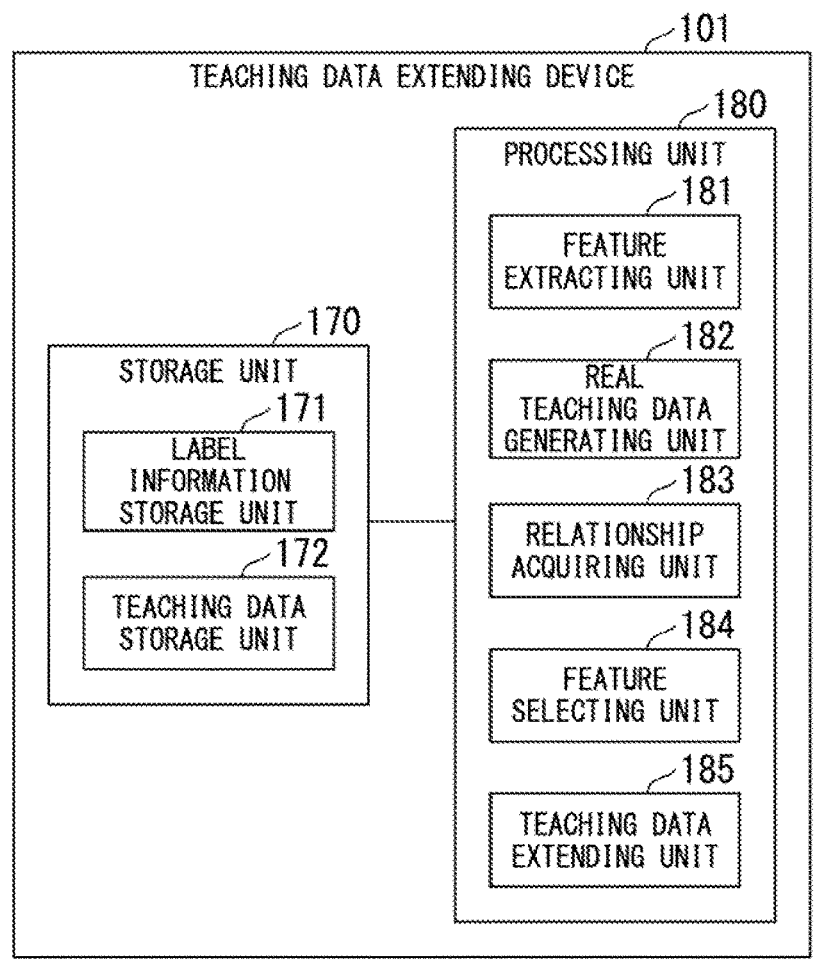
FIG. 1 is a schematic block diagram showing an example of a functional configuration of a teaching data extending device according to a first example embodiment.

FIG. 1 is a schematic block diagram showing an example of a functional configuration of a teaching data extending device according to a first example embodiment. In the configuration shown in FIG. 1, a teaching data extending device 100 includes a storage unit 170 and a processing unit 180. The storage unit 170 includes a label information storage unit 171 and a teaching data storage unit 172. The processing unit 180 includes a feature extracting unit 181, a real teaching data generating unit 182, a relationship acquiring unit 183, a feature selecting unit 184, and a teaching data extending unit 185.

The teaching data extending device 100 acquires a teaching data, and generates a new teaching data by replacing the value of a feature in the acquired teaching data. The teaching data extending device 100 may, for example, be configured by using a computer such as a personal computer (PC) or a workstation. Alternatively, the teaching data extending device 100 may be configured by using dedicated hardware.

The storage unit 170 stores various data. The storage unit 170 is configured by using a storage device included in the teaching data extending device 100.

The label information storage unit 171 stores label information. The label information is information which represents a class into which a classification target represented by the input data is classified. The label information is used as a label (correct answer) in supervised learning. If the input data is time-series image data, the label information may be assigned to the input data in time-series image units, or assigned in image units.

The teaching data storage unit 172 stores real teaching data generated by the real teaching data generating unit 182, and artificial teaching data generated by the teaching data extending unit 185.

The real teaching data referred to here are teaching data that represent a feature of an actual classification target, and are generated using images in which a single classification target is captured, or the sensor data obtained upon sensing of the classification target, or a combination of these.

The artificial teaching data referred to here are teaching data that represent a feature which is different from the features of an actual classification target, such as teaching data obtained by processing real teaching data, or teaching data obtained by calculations.

The processing unit 180 executes various processing by controlling each unit of the teaching data extending device 100. The processing unit 180 may be configured as a result of a CPU (Central Processing Unit) included in the teaching data extending device 100 reading a program from the storage unit 170 and executing it. Alternatively, the teaching data extending device 100 may be configured by using dedicated hardware.

The feature extracting unit 181 acquires input data, and extracts a plurality of features for classifying a classification target from the acquired input data. The feature extracting unit 181 outputs the extracted features to the teaching data extending unit 185.

In the following, a case where the input data is image data will be described as an example. The feature extracting unit 181 may, for example, acquire image data captured by a video camera, an analog camera, or the like, as the input data. Alternatively, the feature extracting unit 181 may acquire image data stored in another storage medium or the like as the input data.

Furthermore, the feature extracting unit 181 may, for example, acquire image data of a plurality of images that are consecutive in time as the input data. Therefore, the feature extracting unit 181 may acquire at least one of image data and image data of a plurality of images that are consecutive in time, as the input data. A plurality of images that are consecutive in time is referred to as time-series images.

Moreover, for example, the feature extracting unit 181 may use from the images, any one of a HOG (Histograms of Oriented Gradients) feature, a SURF (Speeded-Up Robust Features) feature, a human-designed feature such as a color histogram, a feature generated by a neural network such as an autoencoder, or a combination of these, as the features for machine learning.

In addition, for example, the feature extracting unit 181 may extract from time-series images, which bundles a plurality of images that are consecutive in time, any one of; a DT (Dense Trajectories) feature; an STIP (Space Time Interest Points) feature; a human-designed feature such as a change in appearance of the identification target object over time, a periodic movement pattern of the object, or a movement trajectory of the object; a feature generated by a neural network such as an autoencoder; or a combination of these, as the feature for machine learning.

The feature extracting unit 181 may extract features that have been designed for identifying a classification target from input data. Alternatively, the feature extracting unit 181 may use a neural network to design features and extract them from input data.

The real teaching data generating unit 182 generates a real teaching data by associating the plurality of features extracted by the feature extracting unit 181 and the label information stored by the label information storage unit 171.

The relationship acquiring unit 183 obtains a relationship between a plurality of features included in each of a plurality of teaching data. For example, the relationship acquiring unit 183 obtains a relationship between a plurality of features included in each of a plurality of real teaching data. The relationship obtained by the relationship acquiring unit 183 may be a relationship such as uncorrelatedness or independence.

The feature selecting unit 184 selects any one or more of the plurality of features on the basis of the relationship obtained by the relationship acquiring unit 183. For example, the feature selecting unit 184 selects features on the basis of at least one of an uncorrelatedness and an independence between the features. When the features included in a teaching data are uncorrelated with each other, it is thought that processing the value of one feature, or replacing the value with another value, will not affect the other features. In this respect, it is possible to generate a new feature by processing the value of a feature included in the teaching data which is uncorrelated with another feature, or replacing the value with the value of the feature in another teaching data.

The teaching data extending unit 185 generates, for one or more teaching data, new teaching data in which the value of the feature selected by the feature selecting unit 184 has been replaced with the value of the feature in another teaching data classified as being in the same class. The teaching data extending unit 185 may generate a new teaching data by replacing the value of the feature included in the real teaching data as described above.

The teaching data extending unit 185 stores artificial teaching data that are generated in the teaching data storage unit 172.

As a specific example of the processing performed by the teaching data extending unit 185, the generation of a classifier that distinguishes between pears and apples in various stores by using color and brightness as features will be considered.

Figure 2:
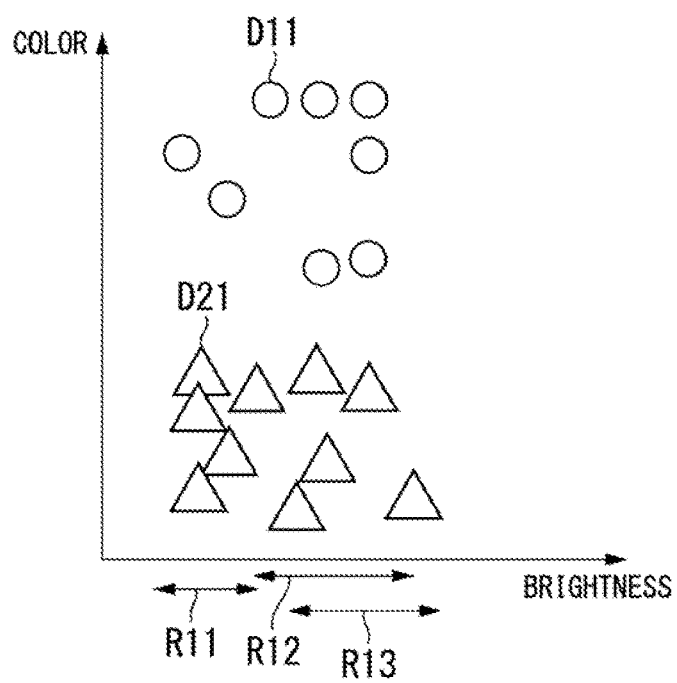
FIG. 2 is a diagram showing an example of real teaching data according to the first example embodiment.

FIG. 2 is a diagram showing an example of real teaching data. The horizontal axis of the graph in FIG. 2 represents the brightness, and the vertical axis represents the color. The color represented by the vertical axis has a smaller red component near the origin, and a larger red component further away from the origin. The brightness represented by the horizontal axis has a smaller brightness near the origin, and a larger brightness further away from the origin.

The teaching data D11 represented by circles (o) represents a real teaching data for apples. The teaching data D12 represented by triangles (Δ) represents a real teaching data for pears.

The regions R11, R12 and R13 indicate the brightness ranges obtained from the images captured at each of the stores A, B and C.

Figure 3:
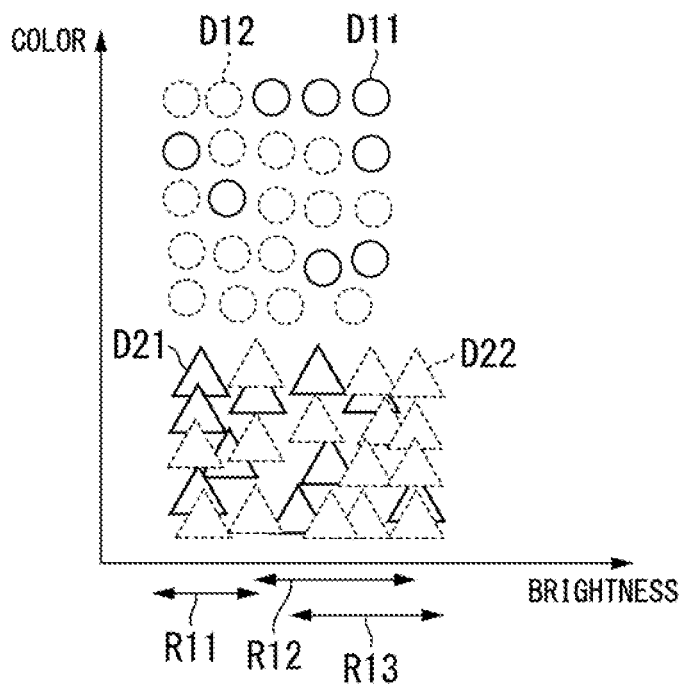
FIG. 3 is a diagram showing an example of artificial teaching data generated by a teaching data extending unit according to the first example embodiment.

FIG. 3 is a diagram showing an example of artificial teaching data generated by the teaching data extending unit 185. The horizontal axis of the graph in FIG. 3 represents the brightness, and the vertical axis represents the color.

The teaching data D11 represented by circles (o) represents a real teaching data for apples as in the case of FIG. 2. The teaching data D21 represented by triangles (Δ) represents a real teaching data for pears as in the case of FIG. 2.

On the other hand, the teaching data D12 represented by broken line circles represents an artificial teaching data for apples. The teaching data D22 represented by broken line triangles represents an artificial teaching data for pears.

The teaching data extending unit 185 generates the new teaching data by combining with the color features within a brightness range included in at least one of the regions R11, R12 and R13, that is to say, included in the brightness range when the images were captured at the stores.

The selection of the features to be combined can be performed by a person (such as a user).

The feature selecting unit 184 selects two or more uncorrelated or independent features as features that can be combined within real teaching data having the same label information, and outputs the selected features to the teaching data extending unit 185. The method by which the feature selecting unit 184 selects the features will be described using the example of distinguishing between apples and pears. However, the content of the following description is not limited to this.

It is assumed that the features for distinguishing apples and pears are, for example, an R component of 125 or more (X1), and a circularity of 0.8 or more (X2). The real teaching data required for learning the classifier in this case is represented by Xcn=(x1, x2). If Xcn corresponds to the feature of X1, x1 of Xcn has a value of "1", and otherwise a value of "0". Similarly, if Xcn corresponds to the feature of X2, x2 of Xcn has a value of "1", and otherwise has a value of "0". The value c represents the class to which the real teaching data corresponds. The value n indicates the nth real teaching data.

The feature selecting unit 184 creates, for example, a cross tabulation table for each class with respect to x1 and x2 based on the real teaching data, determines the independence of the features using a chi-square test, and selects the features that can be combined. However, the method of determining the independence and uncorrelatedness of the features is not limited to this method. For example, the feature selecting unit 184 may use other statistical methods such as independent component analysis, or a method using an information criterion or the like.

As described above, the storage unit 170 is configured by using a storage device included in the teaching data extending device 100. The storage unit 170 may be configured by using a magnetic storage disk device, or may be configured by using an electronic disk device.

The same applies to the label information storage unit 171 and the teaching data storage unit 172, each of which are parts of the storage unit 170.

As described above, the processing unit 180 may be configured by using a computer, or may be configured by using dedicated hardware. The same applies to each unit of the processing unit 180.

Next, the operation of the teaching data extending device 100 will be described.

Figure 4:
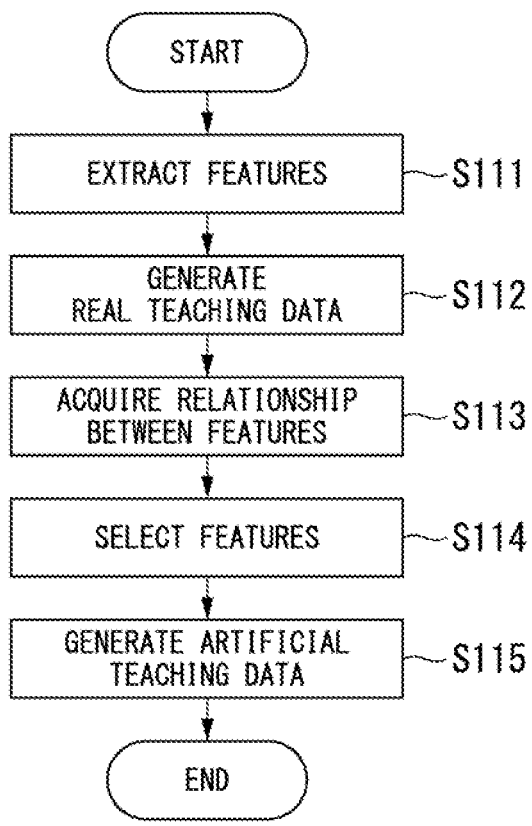
FIG. 4 is a flowchart showing an example of the processing performed by the teaching data extending device according to the first example embodiment.

FIG. 4 is a flowchart showing an example of the processing performed by the teaching data extending device 100. The teaching data extending device 100, for example, starts the processing of FIG. 4 when it receives a user operation that instructs artificial teaching data to be generated.

In the processing of FIG. 4, the feature extracting unit 181 extracts a plurality of features for classifying a classification target from images obtained from a device such as a camera, an external storage medium, or the like (step S111).

The real teaching data generating unit 182 generates real teaching data by associating the plurality of features obtained from the feature extracting unit 181 and the label information obtained from the label information storage unit 171 (step S112).

The relationship acquiring unit 183 acquires a relationship between the plurality of features included in the real teaching data (step S113).

Furthermore, the feature selecting unit 184 selects any one or more of the plurality of features included in the real teaching data generated by the real teaching data generating unit 182 on the basis of the relationship acquired by the relationship acquiring unit 183 (step S114). For example, the feature selecting unit 184 selects a feature having an uncorrelated or independent relationship with another feature.

The teaching data extending unit 185 generates artificial teaching data by replacing the value of the feature selected by the feature selecting unit 184 with the value of the same feature in another real teaching data having the same label information (step S115). That is to say, the teaching data extending unit 185 replaces the value of the feature selected by the feature selecting unit 184 with the value of the same feature in another real teaching data classified as being in the same class. As described above, the teaching data extending unit 185 stores the artificial teaching data that are generated in the teaching data storage unit 172.

After step S115, the teaching data extending device 100 ends the processing of FIG. 4.

As described above, the relationship acquiring unit 183 obtains a relationship between a plurality of features included in each of a plurality of teaching data. The feature selecting unit 184 selects any one or more of the plurality of features on the basis of the relationship obtained by the relationship acquiring unit 183. The teaching data extending unit 185 generates, for one or more teaching data, new teaching data in which the value of the feature selected by the feature selecting unit 184 has been replaced with the value of the feature in another teaching data classified as being in the same class.

According to the teaching data extending device 100, by generating artificial teaching data on the basis of real teaching data, it is possible to reduce the amount of data which needs to be collected in a real environment for machine learning.

Furthermore, in the teaching data extending device 100, it is not necessary for the change scope of the features to be manually determined when generating the artificial teaching data. In this respect, in the teaching data extending device 100, it is possible to reduce the trial costs associated with determining the change scope of the one or more features.

Moreover, the feature extracting unit 181 extracts a plurality of features from input data. The label information storage unit 171 stores label information representing a class in which a classification target represented by the input data is classified. The real teaching data generating unit 182 generates real teaching data by associating the plurality of features extracted by the feature extracting unit 181 and the label information stored by the label information storage unit 171. The relationship acquiring unit 183 obtains a relationship between a plurality of features included in each of the plurality of real teaching data.

As a result, in the teaching data extending device 100, artificial teaching data are generated using the real teaching data generated by itself. Therefore, it is not necessary for the teaching data extending device 100 to acquire real teaching data from another device.

Furthermore, the input data is at least either of an image and a plurality of images that are consecutive in time.

The teaching data extending device 100 is capable of classifying a classification target by machine learning using images.

Moreover, the feature extracting unit 181 extracts a feature that have been designed for identifying a classification target from input data.

The teaching data extending device 100 is capable of classifying a classification target by performing machine learning using teaching data including this feature.

The feature extracting unit 181 may use a neural network to design and extract features.

As a result, it is anticipated that the feature extracting unit 181 is capable of dealing with various features by performing machine learning using a neural network.

The feature selecting unit 184 selects features on the basis of at least either of an uncorrelatedness and an independence between the features.

When features are uncorrelated with or independent of each other, it is thought that changing the value of one feature will not affect the other feature. In this respect, it is anticipated that machine learning having a high accuracy can be performed using the artificial teaching data generated by the teaching data extending device 100.

Furthermore, according to the teaching data extending device 100, when the artificial teaching data are generated, it is not necessary for the user to determine and select the features to be changed, and it is not necessary for the user to determine the scope of changes to the features. In this respect, according to the teaching data extending device 100, it is possible to reduce the burden on the user associated with selecting the features to be changed and determining the scope of changes of one or more features.

Second Example Embodiment

Figure 5:
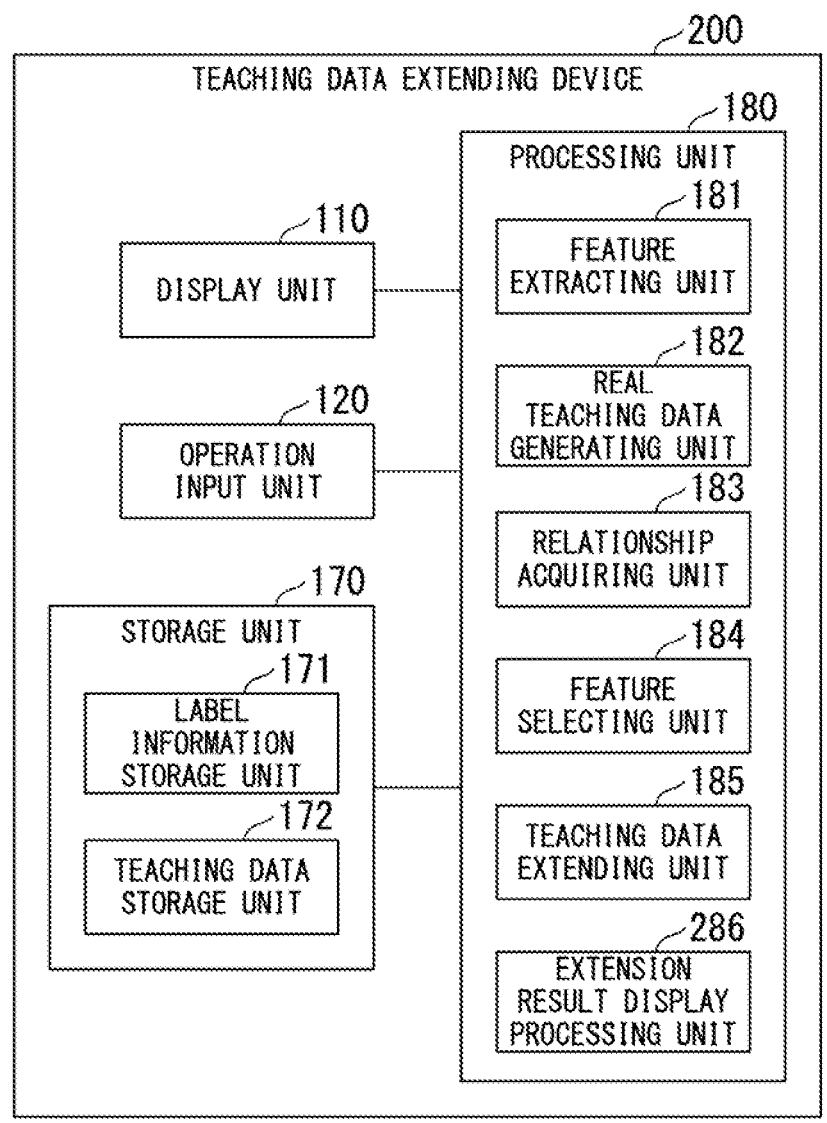
FIG. 5 is a schematic block diagram showing an example of a functional configuration of a teaching data extending device according to a second example embodiment.

FIG. 5 is a schematic block diagram showing an example of a functional configuration of a teaching data extending device according to a second example embodiment. In the configuration shown in FIG. 2, a teaching data extending device 200 includes a display unit 110, an operation input unit 120, a storage unit 170, and a processing unit 180. The storage unit 170 includes a label information storage unit 171 and a teaching data storage unit 172. The processing unit 180 includes a feature extracting unit 181, a real teaching data generating unit 182, a relationship acquiring unit 183, a feature selecting unit 184, a teaching data extending unit 185, and an extension result display processing unit 286.

Of the units shown in FIG. 5, those sections having the same functions as the units in FIG. 1 are denoted by the same reference symbols (170, 171, 172, 180, 181, 182, 183, 184, and 185), and the description will be omitted.

The teaching data extending device 200 differs from the teaching data extending device 100 (FIG. 1) in the respect that the display unit 110 and the operation input unit 120 are included, and in the respect that the processing unit 180 includes the extension result display processing unit 286. The teaching data extending device 200 is the same as the teaching data extending device 100 in the other respects.

The display unit 110 includes, for example, a display screen such as a liquid crystal panel or an LED (Light Emitting Diode), and displays various images. In particular, the display unit 110 displays an artificial teaching data generated by the teaching data extending unit 185.

The operation input unit 120 includes input devices such as a keyboard and a mouse, and accepts user operations. In particular, the operation input unit 120 accepts a user operation that instructs the feature to be replaced by another feature when the artificial teaching data are generated.

The extension result display processing unit 286 controls the display unit 110 to display the artificial teaching data.

Figure 6:
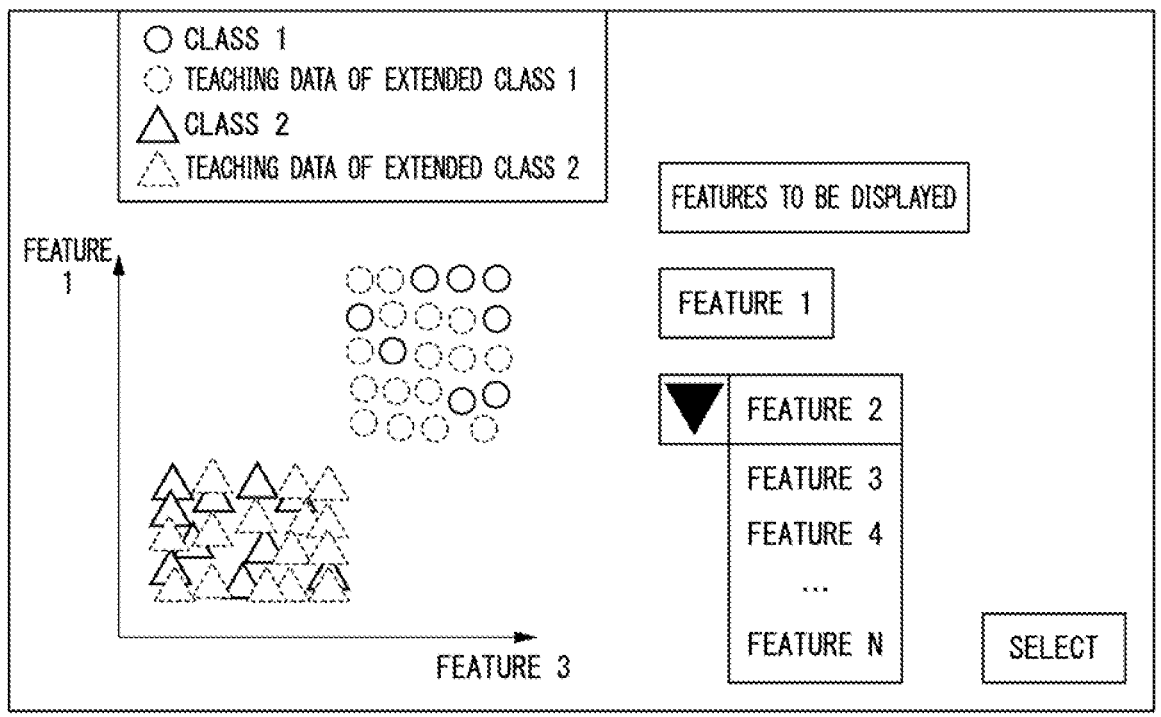
FIG. 6 is a diagram showing an example of a display screen of artificial teaching data displayed by a display unit according to the second example embodiment.

FIG. 6 is a diagram showing an example of a display screen of artificial teaching data displayed by the display unit 110.

In the example of FIG. 6, the display unit 110 displays; a selection field for the features to be displayed in the graph, a graph based on the selected features, and a selection button for confirming the selections.

When the operation input unit 120 receives a user operation that instructs the features to be respectively displayed on the vertical axis and the horizontal axis of the graph, the display unit 110 reflects the user operation in the display of the feature selection field. Furthermore, the feature selecting unit 184 selects the features instructed by the user. The teaching data extending unit 185 generates artificial teaching data in which the value of the feature selected by the feature selecting unit 184 has been replaced with the value of the feature in another teaching data classified as being in the same class. In the example of FIG. 6, the teaching data extending unit 185 temporarily generates the artificial teaching data until the user performs an operation that confirms the selections (a pressing operation of the selection button).

In the example of FIG. 6, the teaching data extending unit 185 temporarily generates an artificial teaching data by replacing the features with the combination of feature 1 and feature 3, and the display unit 110 displays the artificial teaching data on the graph according to a control by the extension result display processing unit 286.

If the user determines that the features displayed on the screen are inappropriate as features for classifying the classes, or wishes to change the features that are combined, the user performs an operation with respect to the feature selection field. The user makes the display unit 110 display a pull-down menu by a user operation made with respect to the feature selection field, and instructs the selection of an arbitrary feature from the displayed pull-down menu.

The feature selecting unit 184 updates the feature selection according to the user instruction. The teaching data extending unit 185 generates artificial teaching data in which the value of the feature selected by the feature selecting unit 184 has been replaced with the value of the feature in another teaching data classified as being in the same class. In this way, when the teaching data extending unit 185 generates the artificial teaching data again, the display unit 110 updates the graph display of the artificial teaching data according to a control by the extension result display processing unit 286.

The pull-down menu displays only those features determined by the feature selecting unit 184 as being capable of being combined. As a result, for example, the user is capable of selecting features that are suitable for distinguishing only a specific class among two or more classes. Furthermore, the teaching data extending device 200 is capable of presenting to the user, in an easily understood form, whether or not the distributions of the real teaching data and artificial teaching data that have been generated are suitable for the classification of the identification target.

In the example of FIG. 6, the operation input unit 120 receives a user operation that instructs a change from feature 3 to feature 2. The feature selecting unit 184 receives this instruction and reselects feature 1 and feature 2. The teaching data extending unit 185 temporarily generates artificial teaching data in which the value of feature 1 and feature 3 selected by the feature selecting unit 184 has been replaced with the value of the feature in another teaching data classified as being in the same class. The display unit 110 updates the graph display to a display of the artificial teaching data generated by the teaching data extending unit 185 according to a control by the extension result display processing unit 286.

If the user determines that the features are suitable for classifying the class of an object included in an image with respect to the presented results, the user performs a pressing operation with respect to the selection button. When the user issues the instruction to confirm the feature selections by a user operation with respect to the selection button, the feature selecting unit 184 stores the generated artificial teaching data in the teaching data storage unit 172.

In the same manner as described in the first example embodiment, in the second example embodiment, the storage unit 170 is configured by using a storage device included in the teaching data extending device 200. The storage unit 170 may be configured by using a magnetic storage disk device, or may be configured by using an electronic disk device.

The same applies to the label information storage unit 171 and the teaching data storage unit 172, each of which are parts of the storage unit 170.

As described in the first example embodiment, in the second example embodiment, the processing unit 180 may be configured by using a computer, or may be configured by using dedicated hardware. The same applies to each unit of the processing unit 180.

The method of presenting the feature selections to the user is not limited to the method described above that provides a screen display. For example, the teaching data extending device 300 may, in addition to or instead of a screen display, present the feature selections to the user by an audio output.

Figure 7:
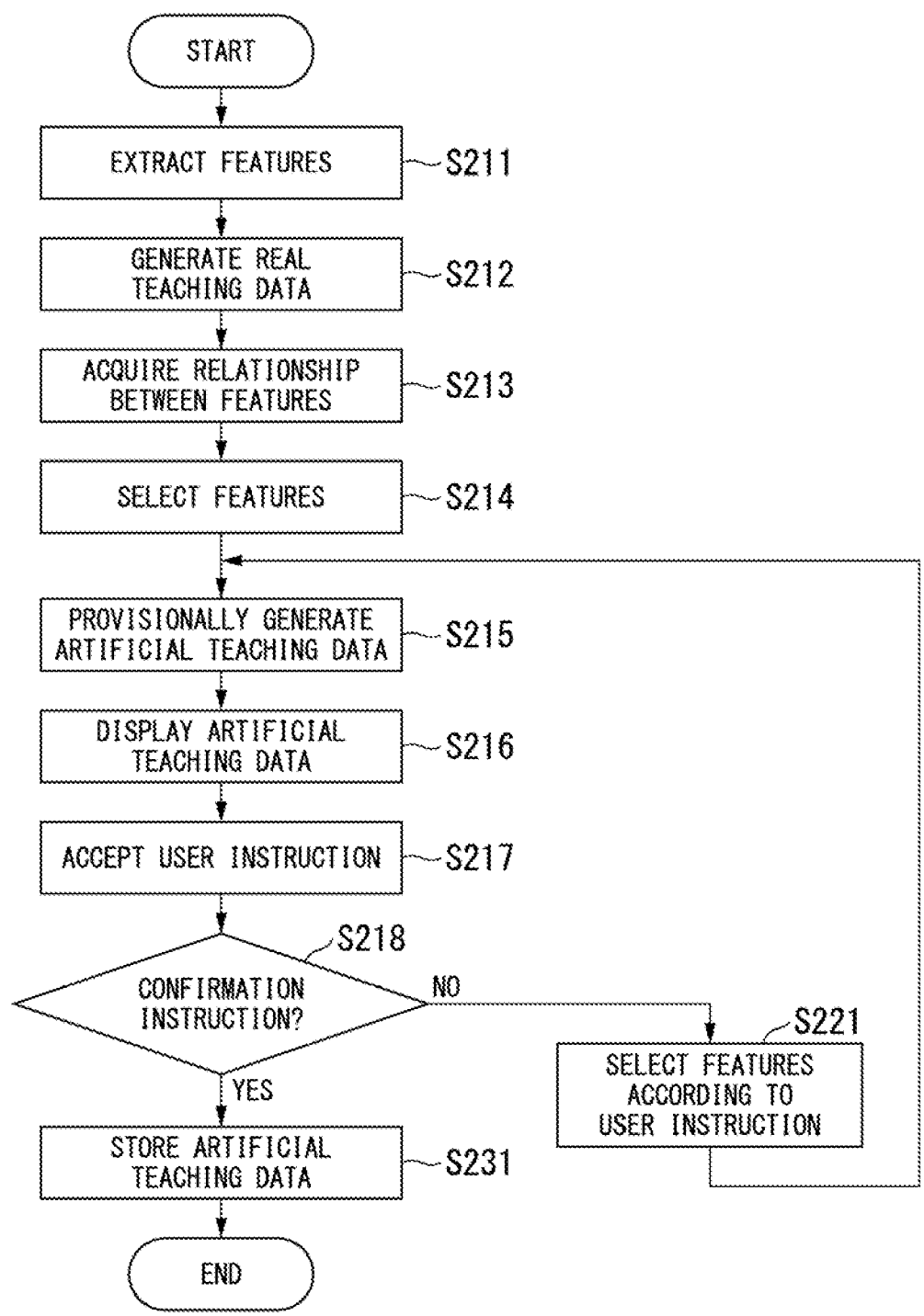
FIG. 7 is a flowchart showing an example of the processing performed by the teaching data extending device according to the second example embodiment.

Next, the operation of the teaching data extending device 200 will be described. FIG. 7 is a flowchart showing an example of the processing performed by the teaching data extending device 200. The steps S211 to S214 in FIG. 7 are the same as the steps S111 to S114 in FIG. 4.

In step S215, the teaching data extending unit 185 generates artificial teaching data in the same manner as step S115 of FIG. 4. However, the artificial teaching data generated here are temporarily generated. Therefore, at this stage, the teaching data extending unit 185 does not store the artificial teaching data in the teaching data storage unit 172.

After step S215, the display unit 110 displays the artificial teaching data that have been temporarily generated by the teaching data extending unit 185 according to a control by the extension result display processing unit 286 (step S216). For example, the display unit 110 displays the artificial teaching data in a graph as shown in the example of FIG. 6.

Next, the operation input unit 120 accepts a user operation (step S217). The processing unit 180 determines whether or not a user operation has been performed that confirms the feature selections (step S218). In the example of FIG. 6, the user operation that confirms the feature selections is performed by a pressing operation of a selection button. If the feature selections are not being confirmed, the user performs an operation that changes the feature selections. In the example of FIG. 6, the user makes the display unit 110 display a pull-down menu, and then selects one of the features shown in the displayed pull-down menu.

If the processing unit 180 determines that a user operation that confirms the feature selections has not been performed (step S218: NO), the feature selecting unit 184 reselects the features according to the user instruction (step S221). Specifically, the feature selecting unit 184 selects the features specified by the user operation that changes the feature selections.

After step S221, the processing returns to step S215.

On the other hand, if the processing unit 180 determines that a user operation that confirms the feature selections has been performed (step S218: NO), the teaching data extending unit 185 stores the artificial teaching data that have been generated, in the teaching data storage unit 172 (step S231).

After step S231, the teaching data extending device 200 ends the processing of FIG. 7.

As described above, the display unit 110 displays the teaching data generated by the teaching data extending unit 185. The operation input unit 120 accepts user operations that instruct a feature to be replaced by another feature. The feature selecting unit 184 selects any one or more of the plurality of features according to the user operation.

According to the teaching data extending device 200, the user determination can be reflected in the generation of the artificial teaching data.

For example, as a result of the teaching data extending device 200 presenting the distribution of the generated artificial teaching data to the user in a graph display, the user is capable of intuitively determining whether or not they are suitable for classifying the class of the object included in the input data. The feature selecting unit 184 receives user operations and is capable of selecting features such that the classification accuracy is maximized.

Third Example Embodiment

Figure 8:
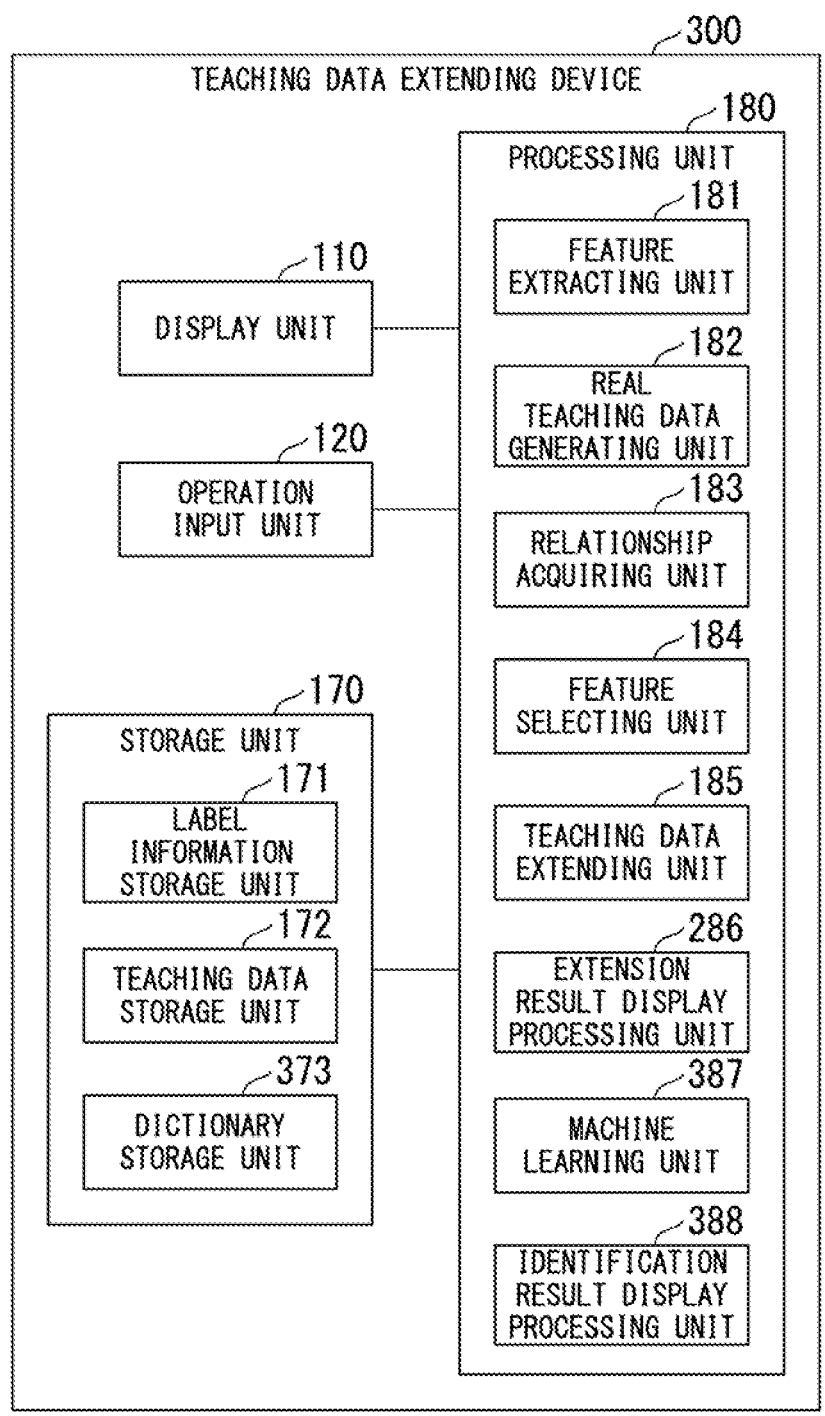
FIG. 8 is a schematic block diagram showing an example of a functional configuration of a teaching data extending device according to a third example embodiment.

FIG. 8 is a schematic block diagram showing an example of a functional configuration of a teaching data extending device according to a third example embodiment. In the configuration shown in FIG. 8, the teaching data extending device 300 includes a display unit 110, an operation input unit 120, a storage unit 170, and a processing unit 180. The storage unit 170 includes a label information storage unit 171, a teaching data storage unit 172, and a dictionary storage unit 373. The processing unit 180 includes a feature extracting unit 181, a real teaching data generating unit 182, a relationship acquiring unit 183, a feature selecting unit 184, a teaching data extending unit 185, an extension result display processing unit 286, a machine learning unit 387, and an identification result display processing unit 388.

Of the units in FIG. 8, those sections having the same functions as the units in FIG. 1 or 4 are denoted using the same reference symbols (110, 120, 170, 171, 172, 180, 181, 182, 183, 184, 185, and 286), and the description will be omitted.

The teaching data extending device 300 differs from the teaching data extending device 200 (FIG. 4) in the respect that the storage unit 170 includes a dictionary storage unit 373, and in the respect that the processing unit 180 includes a machine learning unit 387 and an identification result display processing unit 388. The teaching data extending device 300 is the same as the teaching data extending device 200 in the other respects.

The machine learning unit 387 performs machine learning of a classifier using at least the artificial teaching data generated by the teaching data extending unit 185. For example, the machine learning unit 387 performs machine learning of a classifier using both real teaching data and artificial teaching data.

The machine learning unit 387 may learn a classifier by using a machine learning method such as an SVM (Support Vector Machine) or deep learning. Furthermore, the learning unit 70 may use a network such as an LSTM (Long Short Term Memory). For this reason, the storage unit 170 may store the features extracted from the images or the time-series images, and a time-series identification result.

The dictionary storage unit 373 stores the classifier obtained from machine learning performed by the machine learning unit 387.

The identification result display processing unit 388 causes the display unit 110 to display the learning result by the machine learning unit 387. Specifically, the identification result display processing unit 388 causes the display unit 110 to display the identification result when an image, which represents an identification target, is input to the classifier obtained from machine learning by the machine learning unit 387.

Figure 9:
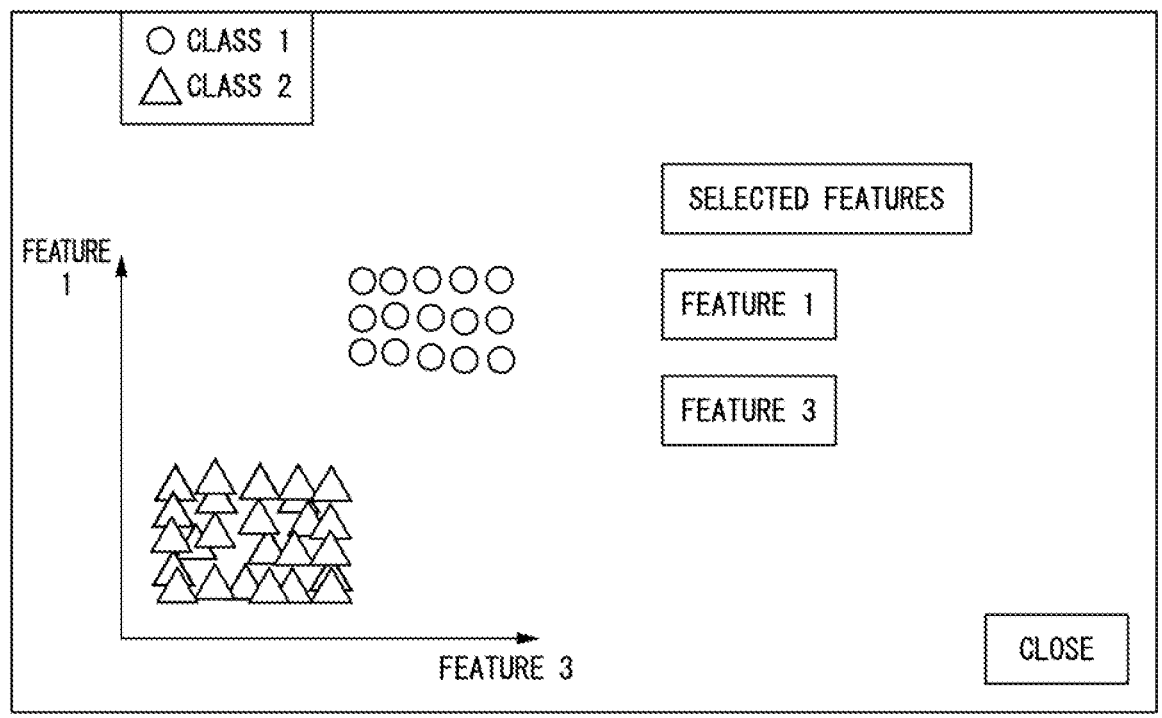
FIG. 9 is a diagram showing a display example of a learning result by a machine learning unit according to the third example embodiment.

FIG. 9 is a diagram showing a display example of a learning result by the machine learning unit 387. The horizontal axis and the vertical axis of the graph shown in FIG. 9 represent the features used in the identification performed by the classifier of the learning result. Furthermore, the circle (o) and triangle (Δ) symbols each represent classes, which are identification results of the images input to the classifier.

The display unit 110 may display a pull-down menu for feature selection in the same manner as FIG. 6, and the processing unit 180 may set the feature specified by a user operation as the axe of the graph and cause the classifier of the learning result to perform identification.

Moreover, FIG. 9 shows an example of a case where the display unit 110 is displaying an identification result using a two-dimensional graph, but it is not limited to this. When there are three or more features to be combined, the display unit 110 may display the identification result in a display form that corresponds to the number of features to be combined.

In the same manner as described in the first example embodiment and the second example embodiment, in the third example embodiment, the storage unit 170 is configured by using a storage device included in the teaching data extending device 300. The storage unit 170 may be configured by using a magnetic storage disk device, or may be configured by using an electronic disk device.

The same applies to the label information storage unit 171, the teaching data storage unit 172, and the dictionary storage unit 373, each of which are parts of the storage unit 170.

As described in the first example embodiment and the second example embodiment, in the third example embodiment, the processing unit 180 may be configured by using a computer, or may be configured by using dedicated hardware. The same applies to each unit of the processing unit 180.

The method of presenting the learning result to the user is not limited to the method described above that provides a screen display. For example, the teaching data extending device 300 may, in addition to or instead of a screen display, present the learning result to the user by an audio output.

Next, the operation of the teaching data extending device 300 will be described.

Figure 10:
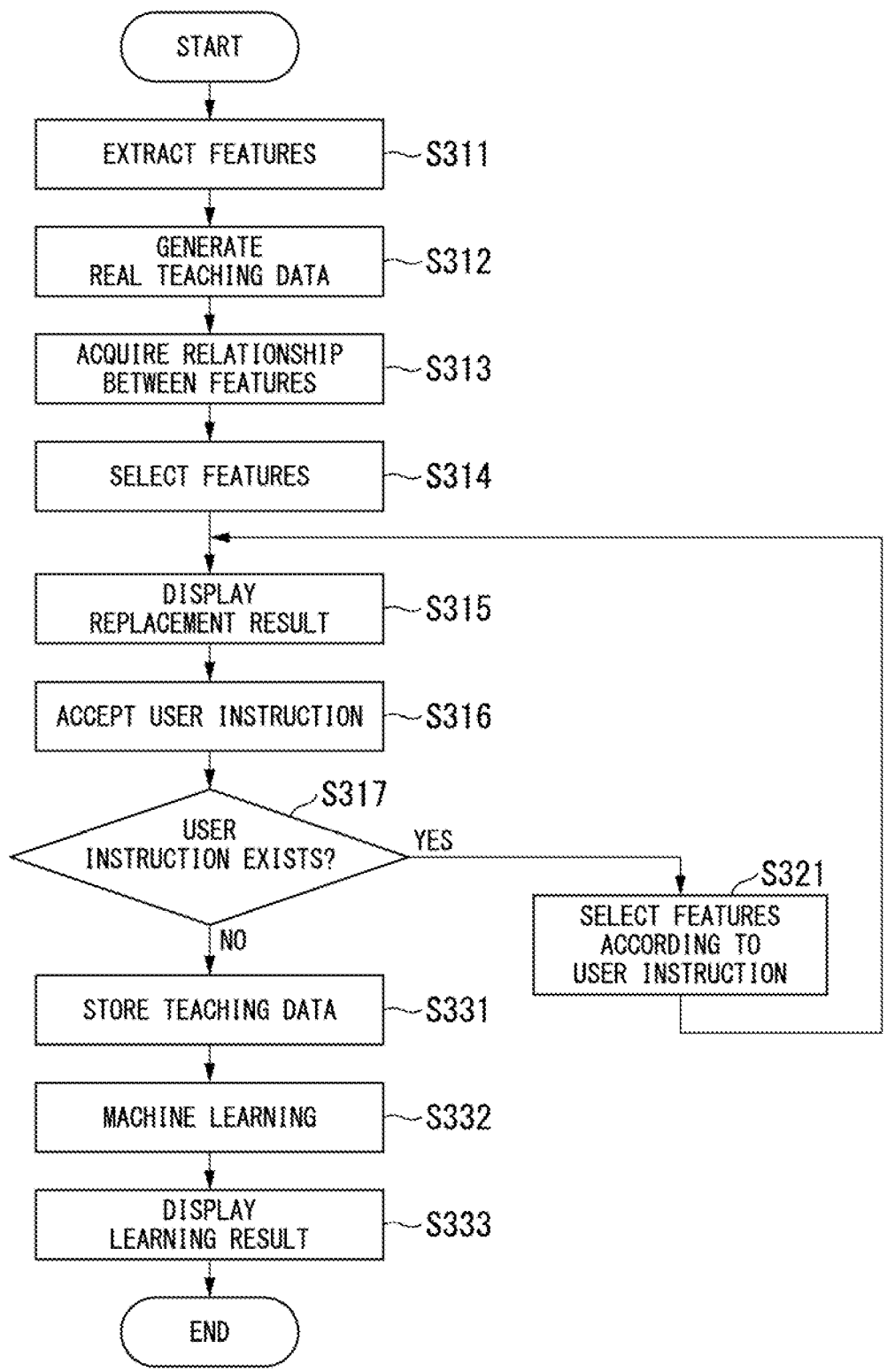
FIG. 10 is a flowchart showing an example of the processing performed by the teaching data extending device according to the third example embodiment.

FIG. 10 is a flowchart showing an example of the processing performed by the teaching data extending device 300. The steps S311 to S331 in FIG. 10 are the same as the steps S211 to S231 in FIG. 7.

After step S331, the machine learning unit 387 reads the real teaching data and the artificial teaching data from the teaching data storage unit 172, and performs machine learning of a classifier using the obtained real teaching data and artificial teaching data (step S332). The machine learning unit 387 stores the classifier obtained as a result of machine learning in the dictionary storage unit 373.

Furthermore, the processing unit 180 performs identification of the image using the obtained classifier, and the display unit 110 displays the identification result by the classifier as the result of machine learning according to a control by the identification result display processing unit 388 (step S333).

After step S333, the teaching data extending device 300 ends the processing of FIG. 10.

As described above, the machine learning unit 387 performs machine learning of a classifier using at least the artificial teaching data generated by the teaching data extending unit 185.

According to the teaching data extending device 300, even when the number of real teaching data that are obtained is small, machine learning can be performed using a larger number of teaching data by using artificial teaching data. In this respect, according to the teaching data extending device 300, the burden of acquiring real teaching data can be reduced, and further, machine learning can be performed with a higher accuracy using a larger number of teaching data.

Fourth Example Embodiment

In the fourth example embodiment, an example of a configuration of a teaching data extending device will be described.

Figure 11:
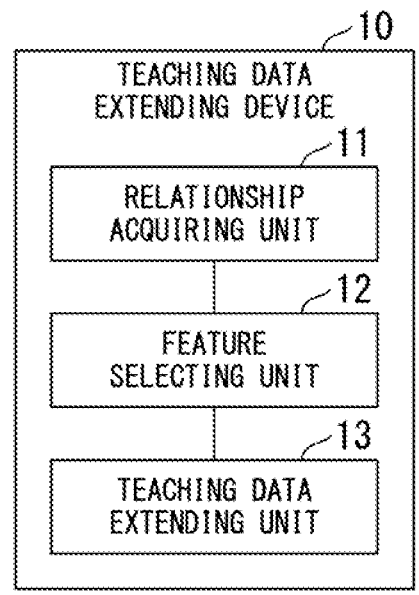
FIG. 11 is a diagram showing an example of a configuration of a teaching data extending device according to a fourth example embodiment.

FIG. 11 is a diagram showing an example of a configuration of a teaching data extending device according to the fourth example embodiment. In the configuration shown in FIG. 11, a teaching data extending device 10 includes a relationship acquiring unit 11, a feature selecting unit 12, and a teaching data extending unit 13.

In this configuration, the relationship acquiring unit 11 obtains a relationship between a plurality of features included in each of a plurality of teaching data. The feature selecting unit 12 selects any one or more of the plurality of features on the basis of the relationship obtained by the relationship acquiring unit 11. The teaching data extending unit 13 generates, for one or more teaching data, new teaching data in which the value of the feature selected by the feature selecting unit 12 has been replaced with the value of the feature in another teaching data classified as being in the same class.

According to the teaching data extending device 10, by generating artificial teaching data on the basis of real teaching data, it is possible to reduce the amount of data which needs to be collected in a real environment for machine learning.

Furthermore, in the teaching data extending device 10, it is not necessary for the change scope of the features to be manually determined when generating the artificial teaching data. In this respect, in the teaching data extending device 10, it is possible to reduce the trial costs associated with determining the change scope of the one or more features.

Figure 12:
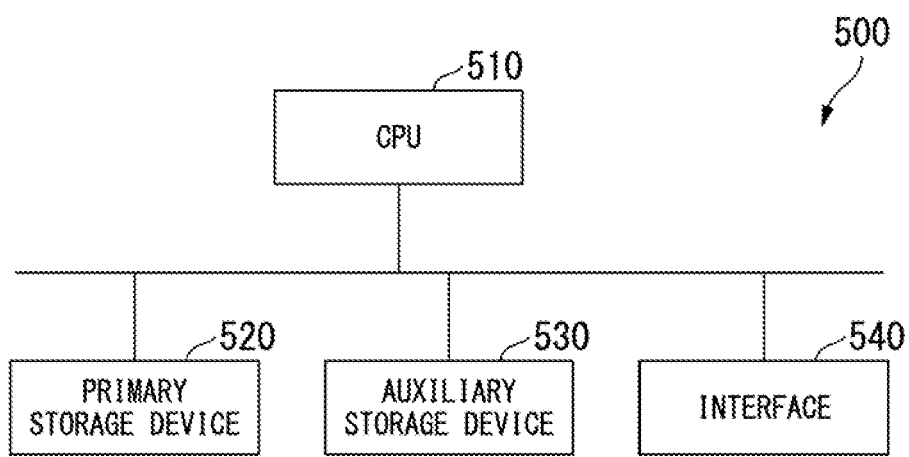
FIG. 12 is a schematic block diagram showing a configuration of a computer according to at least one example embodiment.

FIG. 12 is a schematic block diagram showing a configuration of a computer according to at least one example embodiment. In the configuration shown in FIG. 12, a computer 500 includes a CPU 510, a primary storage device 520, an auxiliary storage device 530, and an interface 540.

When any one or more of the teaching data extending devices 10, 100, 200, and 300 described above are implemented on a computer, the operation of each of the processing units mentioned above is stored in the auxiliary storage device 530 in the form of a program. The CPU 510 executes the processing of each processing unit by reading a program from the auxiliary storage device 530, and then executing the program by expanding it in the primary storage device 520. Furthermore, the CPU 510 secures, according to the program, a storage area in the auxiliary storage device 530 that corresponds to each of the storage units mentioned above. The functions of the display unit 110 and the operation input unit 120 are executed as a result of the CPU 500 controlling a display device and an input device serving as the interface 540 according to the program.

A program for realizing some or all of the functions of the control unit 180 may be recorded in a computer-readable recording medium, and the processing of each unit may be performed by a computer system reading and executing the program recorded on the recording medium. The "computer system" includes an OS (operating system) and hardware such as a peripheral device.

The "computer-readable recording medium" refers to a portable medium such as a flexible disk, a magnetic optical disk, a ROM, or a CD-ROM, or a storage device such as a hard disk built into a computer system. Furthermore, the program may be one capable of realizing some of the functions described above. Further, the functions described above may be realized in combination with a program already recorded in the computer system.

Example embodiments of the present invention have been described in detail above with reference to the drawings. However, specific configurations are in no way limited to the example embodiments, and include design changes and the like within a scope not departing from the gist of the present invention.

INDUSTRIAL APPLICABILITY

The example embodiments of the present invention may be applied to a teaching data extending device, a teaching data extending method, and a program.

REFERENCE SYMBOLS 10, 100, 200, 300 Teaching data extending device
11, 183 Relationship acquiring unit
12, 184 Feature selecting unit
13, 185 Teaching data extending unit
110 Display unit
120 Operation input unit
170 Storage unit
171 Label information storage unit
172 Teaching data storage unit
180 Processing unit
181 Feature extracting unit
182 Real teaching data generating unit
286 Extension result display processing unit
373 Dictionary storage unit
387 Machine learning unit
388 Identification result display processing unit

What is claimed is:

1. A teaching data extending device comprising:
at least one memory storing instructions; and
at least one processor configured to execute the instructions to:
obtain a relationship between a plurality of features included in each of a plurality of teaching data;
select any one or more of the plurality of features based on the relationship; and
generate new teaching data by replacing a value of a selected feature included in first teaching data among the plurality of teaching data with a value of a selected feature included in second teaching data among the plurality of teaching data, a class of the second teaching data being a same as a class of the first teaching data.

2. The teaching data extending device according to claim 1, wherein the at least one processor is configured to execute the instructions to extract a plurality of features from input data,
the at least one memory comprises a memory that stores label information representing a class in which a classification target represented by the input data is classified,
the at least one processor is configured to execute the instructions to:
generate real teaching data by associating the plurality of extracted features and the stored label information; and obtain the relationship by obtaining a relationship between a plurality of features included in a plurality of the real teaching data.

3. The teaching data extending device according to claim 2, wherein the input data is at least either of an image and a plurality of images that are consecutive in time.

4. The teaching data extending device according to claim 2, wherein extracting the plurality of features comprises extracting the features that have been designed to identify the classification target from the input data.

5. The teaching data extending device according to claim 2, wherein extracting the plurality of features comprises designing a feature using a neural network and extracting the designed feature.

6. The teaching data extending device according to claim 1, wherein selecting any one or more of the plurality of features comprises selecting the feature based on at least one of an uncorrelatedness and an independence between the features.

7. The teaching data extending device according to claim 1, further comprising:
a display that displays the generated teaching data; and
an interface that accepts a user operation that instructs a feature to be replaced by another feature,
wherein selecting any one or more of the plurality of features comprises selecting any one or more of the plurality of features according to the user operation.

8. The teaching data extending device according to claim 1, wherein the at least one processor is configured to perform machine learning of a classifier by using at least the generated teaching data.

9. A teaching data extending method performed by a computer and comprising:
obtaining a relationship between a plurality of features included in each of a plurality of teaching data;
selecting any one or more of the plurality of features based on the relationship; and
generating new teaching data by replacing a value of a selected feature included in first teaching data among the plurality of teaching data with a value of a selected feature included in second teaching data among the plurality of teaching data, a class of the second teaching data being a same as a class of the first teaching data.

10. A non-transitory computer readable recording medium storing a program for causing a computer to execute:
obtaining a relationship between a plurality of features included in each of a plurality of teaching data;
selecting any one or more of the plurality of features based on the relationship; and
generating new teaching data by replacing a value of a selected feature included in first teaching data among the plurality of teaching data with a value of a selected feature included in second teaching data among the plurality of teaching data, a class of the second teaching data being a same as a class of the first teaching data.

* * * * *